May 25, 1954

W. S. DORSEY 2,679,542

PROCESS FOR THE PRODUCTION OF ACETYLENE

Filed April 9, 1951

INVENTOR.
WILLIAM SMITH DORSEY,
BY
Richard C. Newman

ATTORNEY.

Patented May 25, 1954

2,679,542

UNITED STATES PATENT OFFICE 2,679,542

PROCESS FOR THE PRODUCTION OF ACETYLENE

William Smith Dorsey, Fullerton, Calif., assignor to Union Oil Company of California, Los Angeles, Calif., a corporation of California Application April 9, 1951, Serial No. 219,936

14 Claims. (Cl. 260—679)

This invention relates to a process for the production of acetylene, and in particular concerns an improved process for the manufacture of acetylene by the partial oxidation of hydrocarbons.

In the co-pending applications of John L. Bills, Serial No. 178,132, filed August 7, 1950, and Serial No. 240,728, filed August 7, 1951, there is described a process whereby acetylene is produced by preheating a reactant gas mixture comprising a hydrocarbon and oxygen, admixing hydrogen with the preheated gas mixture whereby an exothermic reaction occurs with a consequent increase in temperature to about 1100°—1500° C., and thereafter quench cooling the resulant hot product gas to a relatively low temperature within a very short period of time. The preheat temperature is so controlled that the requisite high reaction temperature derives from the exothermic heat of the reaction itself and without the addition of any further substantial quantity of heat. This process is highly effective in securing relatively high yields of acetylene based on the quantity of hydrocarbon consumed, and is particularly attractive from the standpoint of chemical cost since air may be employed as the source of oxygen and the hydrocarbon may be low-cost natural gas. Also, thermal requirements are lower than those of prior art partial oxidation processes since lower preheat temperatures are employed and no heat need be supplied directly to the reaction from exterior sources. Carbon black formation is substantially nil. One of the most essential and distinguishing features of this process lies in the use of hydrogen in the manner specified to initiate the acetylene-producing reaction, and the various advantages of the process cannot be realized by omitting the hydrogen addition step or by admixing the hydrogen with the reactant gas mixture prior to preheating. There is no overall consumption of hydrogen in the process, however, and under usual conditions of operation the product gas often contains more hydrogen than was originally added to the preheated reactant gas, i. e., the process results in a net production of hydrogen. Accordingly, the use of hydrogen in the stated manner does not add to the chemical costs involved since such hydrogen may be recovered from the product gas and recycled back to the reaction zone indefinitely. However, it is usually necessary to recycle from 5 to 10 volumes of hydrogen per volume of acetylene produced, and even though the hydrogen may be employed in admixture with certain other components of the product gas, the cost of separating and handling this quantity of hydrogen constitutes a very material part of the total cost of producing acetylene by this process. Any means by which the amount of hydrogen employed can be reduced without sacrificing the other economic and operational advantages which are characteristic of this process would be of great value in providing low-cost acetylene from cheap natural gas or methane and air.

It is accordingly an object of the present invention to provide means whereby the amount of hydrogen required in the aforesaid acetylene process may be materially reduced.

Another object is to provide a means for effecting a significant reduction in the cost of producing acetylene by the partial oxidation of hydrocarbons.

A further object is to provide an improved process for the manufacture of acetylene from natural gas or methane and air.

Other objects will be apparent from the following detailed description of the invention, and various advantages not specifically referred to herein will be apparent to those skilled in the art upon employment of the invention in practice.

I have now found that the above and related objects may be realized in a process whereby the added hydrogen is employed to form a gaseous layer or film along the walls of a reaction zone into which the preheated reactant gas is introduced in a plurality of separate streams. More particularly, I have found that the amount of hydrogen required to secure the unique advantages of the aforesaid process may be very substantially reduced by preheating the reactant gas in a plurality of separate streams and introducing the streams of preheated gas into the central or axial portion of a common reaction zone while introducing hydrogen into the reaction zone adjacent the periphery thereof so that a gaseous film comprising hydrogen is interposed between the walls of the reaction zone and at least the major portion of the preheated reactant gas entering the reaction zone. By operating in such manner, the amount of hydrogen supplied per volume of acetylene produced may be reduced by one-half or more without adversely affecting the acetylene yields and heat requirements or causing the deposition of any substantial quantity of carbon black within the reactor. Moreover, even though the amount of hydrogen introduced into the reaction zone in the present process is considerably less than that which must be employed in the prior hydrogen addition process, the amount of hydrogen in the product gas is substantially the same. Thus, the present process produces considerably more hydrogen than is required for its operation, and separation of the small amount of hydrogen required for recycling purposes from the product gas is relatively simple and inexpensive.

The manner in which such mode of procedure operates to secure these results is not known with cetrainty, but it is postulated that mixing of the hydrogen and reactant gas takes place in a relatively narrow zone surrounding their nominal boundary, thereby effecting within such zone the acetylene-producing reaction referred to above, and that the exothermic heat of this reaction raises the temperature of the more centrally located portion of the reactant gas to the point where the conventional partial oxidation reaction occurs within this portion of the gas in the substantial absence of hydrogen. The latter reaction is usually characterized by the deposition of large quantities of carbon on the walls of the reaction zone, but in the present instance the body of gas undergoing this reaction is separated from the walls of the reaction zone by a film of hydrogen, and carbon black deposition is substantially prevented. It is to be understood, however, that the invention is not limited by these postulations concerning the possible mechanism of its operation.

The process of the invention will be more clearly understood by reference to the accompanying drawings which form a part of this specification. In said drawings.

Figure 1:
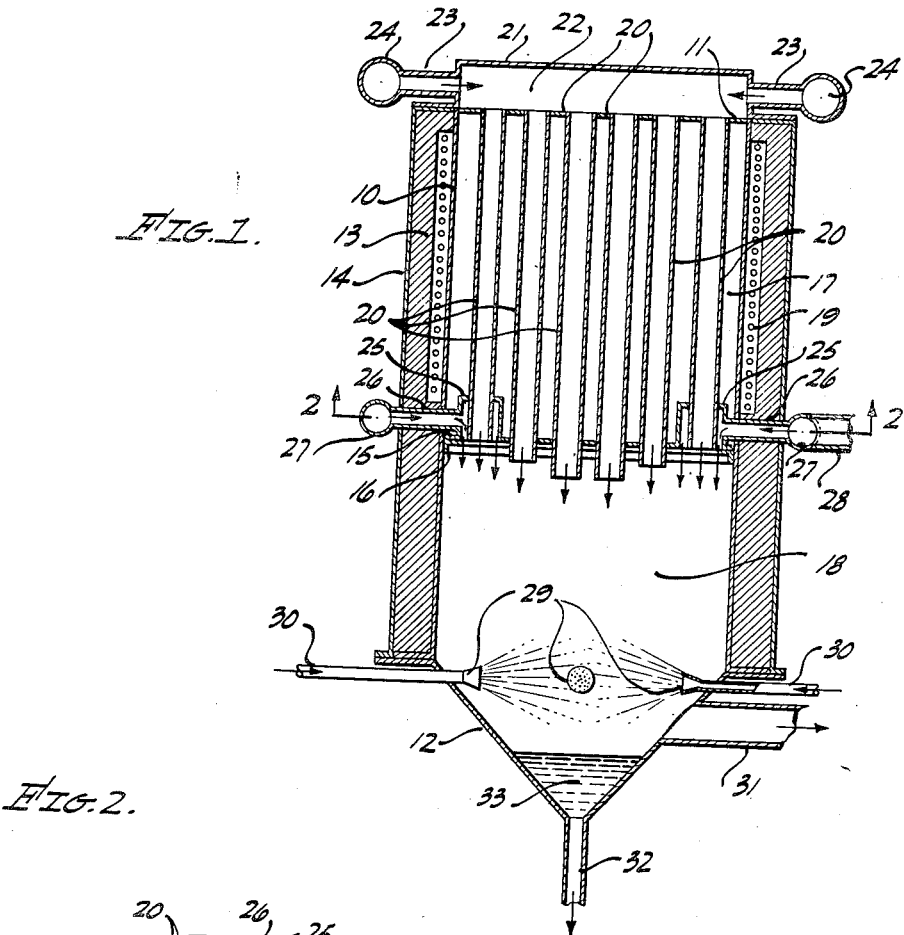
Figure 1 represents a longitudinal cross-sectional view of a simple reactor which may be employed in the practice of the invention.
Figure 2:
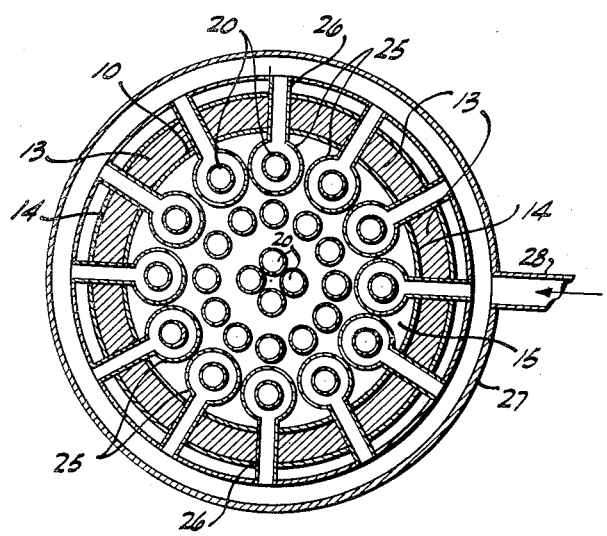
Figure 2 represents a transverse cross-sectional view of this reactor taken along line 2—2 of Figure 1.

Referring now to Figures 1 and 2, in which like numerals designate like parts, the illustrated reactor comprises a vertically disposed cylindrical vessel having refractory side-walls 10, an upper end closure 11 and a conical bottom closure 12. Side-walls 10 are surrounded by a layer of thermal insulation 13 held in place by jacket 14. Within the vessel, a transverse refractory partition 15 supported by ring 16 divides the enclosed space into a preheating zone 17 and a reaction zone 18. Heating element 19, diagrammatically shown as an electric heating coil, is positioned around the walls of preheating zone 17 to supply heat thereto. End closure 11 and transverse partition 15 are provided with coaxial holes to receive opposite ends of a plurality of preheating tubes 20 arranged in concentric circular pattern.

Tubes 20 which are peripherally located, i. e., adjacent the walls of reaction zone 18, are shown terminating at partition 15, whereas those more centrally located are shown extending into reaction zone 18 a short distance and those most centrally located are shown extending even farther into the reaction zone. Alternatively, all of the preheating tubes may be of the same length. Header 21 closes off the upper end of the reactor and forms a reactant gas introduction zone 22 which communicates by means of reactant gas inlets 23 with manifold 24. Preheating tubes 20 thus communicate between introduction zone 22 and reaction zone 18, and traverse preheating zone 17. Positioned coaxially around those of preheating tubes 20 which are located adjacent to the walls of reaction zone 18, i. e., the peripheral ring of preheating tubes 20, are hydrogen introduction conduits 25 which communicate with reaction zone 18. Hydrogen inlets 26 communicate between hydrogen introduction conduits 25 and manifold 27 which in turn is provided with a hydrogen supply line 28 leading from a source of hydrogen, not shown. The combination of supply line 28, manifold 27, inlets 26, and conduits 25 permits hydrogen to be introduced into reaction zone 18 in such manner as to form a film comprising hydrogen between the walls of reaction zone 18 and the preheated reactant gas which is introduced into the reaction zone via preheating tubes 20. Spray nozzles 29 provided near the bottom of the vessel communicate by means of conduits 30 to a source of quenching medium, e. g., water, not shown, and serve to quench the hot product gases issuing from the reaction zone. A product gas withdrawal conduit 31 is positioned below the spray nozzles, and communicates with product gas storage means, not shown. Conduit 32 is provided at the bottom of the vessel for withdrawal of the quenching medium 33.

Operation of this reactor in accordance with the process of the invention is carried out as follows: The reactant gas, which comprises a suitably proportioned mixture comprising a hydrocarbon and oxygen, e. g., a mixture of natural gas or methane and air, is introduced into manifold 24 and passes via inlets 23 and introduction zone 22 through preheating tubes 20 and into reaction zone 18. During passage through tubes 20, the reactant gas is raised to the necessary preheat temperature, e. g., 600°–1150° C., heat being supplied from heating element 19. Simultaneously, hydrogen is introduced into manifold 27 from supply line 28, and passes via inlets 26 and conduits 25 into reaction zone 18. Since conduits 25 are positioned around the periphery of the vessel adjacent the walls thereof, the hydrogen forms a gaseous layer or film adjacent the walls of reaction zone 18. Within the reaction zone the acetylene-producing reaction takes place as previously described, thereby forming a hot product gas which is quench cooled as it passes through the spray of liquid cooling medium supplied through spray nozzles 29. The cooled product gas is withdrawn through conduit 31 and passes to gas storage means. The velocity of the gas passing through the reactor is controlled in accordance with the capacity and design of the reactor so that the reactant gas is heated to the requisite pre-heat temperature by the time it issues into the reaction zone from the preheating tubes, and so that the product gas is cooled to a temperature at which substantially no further reaction occurs within the requisite short period of time, as is more fully described below.

Considering now the essential operating details of the new process, the reactant gas consists essentially of a proportioned mixture of a hydrocarbon and oxygen. A wide variety of hydrocarbons are suitable, but best results are obtained with non-aromatic hydrocarbons, particularly those which are normally gaseous or liquid and boil below about 400° F. under atmospheric pressure. The term "non-aromatic hydrocarbon" is herein employed as a generic term including saturated and unsaturated aliphatic and cyclo-aliphatic hydrocarbons but excluding aromatic or benzenoid hydrocarbons. The normally gaseous saturated aliphatic hydrocarbons, particularly methane and natural gas, are especially preferred by reason of their low cost and ease of handling. Hydrocarbon mixtures, e. g., mixed refinery gases and various petroleum distillates are also suitable. When employing a liquid hydrocarbon reactant, it is preferably vaporized prior to its admixture with the oxygen and/or prior to being preheated, although such vaporization may be effected as a part of the preheating step. The oxygen reactant is pure oxygen itself, oxygen-enriched air, ordinary air, or any other gas containing free oxygen. Air is preferred by reason of its lack of cost, and it is one of the features of the process that the results obtained employing air are comparable or better than those of previous processes in which pure oxygen has been employed. The mole ratio of hydrocarbon to oxygen in the reactant gas varies between rather wide limits depending upon the identity of the hydrocarbon. When the hydrocarbon is one of relatively high molecular weight, e. g., a petroleum distillate such as kerosene, as many as 50 moles of oxygen should be provided per mole of hydrocarbon. On the other hand, when the hydrocarbon is a normally gaseous saturated aliphatic hydrocarbon, e. g., methane, natural gas, ethane, etc., an excess of hydrocarbon is employed so that the mole ratio of hydrocarbon to oxygen is suitably between about 1.33/1 and about 3.0/1. Thus, the mole ratio of hydrocarbon to oxygen varies from about 0.02/1 to about 3.0/1 depending upon the nature of the hydrocarbon. When the oxygen reactant is in the form of air and the hydrocarbon is methane or natural gas, the reactant gas preferably comprises between about 17 and about 30 per cent by volume of the hydrocarbon and, correspondingly, between about 83 and about 70 per cent by volume of air. When the reactant gas comprises air and a petroleum distillate such as kerosene, it may contain from about 4 to about 10 per cent by volume of the hydrocarbon vapor and from about 96 to about 90 per cent by volume of air. If desired, two or more reactant gas compositions may be employed, e. g., the reactant gas which is introduced into the central portion of the reaction zone may be somewhat richer in the hydrocarbon component than the reactant gas which is introduced near the peripheral film of hydrogen.

The hydrogen which, according to the process of the invention, is introduced into the reaction zone along the periphery thereof so as to provide a gaseous layer or film comprising hydrogen between the walls of the reaction zone and at least a major part of the reactant gas which is introduced therein may be pure hydrogen or a suitable mixture of hydrogen and an inert gas which does not react with the other components of the system under the conditions existing in the reaction zone, e. g., nitrogen, carbon monoxide, carbon dioxide, water vapor, etc. The term "hydrogen-containing gas" is herein employed as a generic term to include pure hyrogen as well as mixtures comprising free hydrogen and an inert gas. Employment of the hydrogen in admixture with an inert gas is usually more economical than the use of pure hydrogen, and in some instances is more advantageous from an engineering standpoint. The product gas for the most part comprises hydrogen, nitrogen and carbon monoxide in addition to unreacted hydrocarbon and the acetylene product. While it is possible to separate all of these components in substantially pure form and thus recover pure hydrogen for re-use in the process, it is much simpler to separate the hydrogen in admixture with part of the nitrogen and/or carbon monoxide and to employ such mixture as the hydrogen-containing gas which is introduced along the walls of the reaction zone. Thus, employing the hydrogen in the form of a mixture with nitrogen or carbon monoxide or both is superior to employing the hydrogen in pure form in instances where it is desirable to recover hydrogen from the product gas and re-use it in the process. Such mixture may comprise as much as about 70 per cent by volume of the inert gas. Accordingly, the hydrogen-containing gas employed in the process may comprise from about 30 to 100 per cent by volume of hydrogen and from about 70 to zero per cent by volume of an inert gas. Since the inert gas has a cooling effect within the reaction zone, the use of mixtures containing relatively large proportions of the inert gas requires the use of higher preheat temperatures in order to secure the necessary high reaction temperature, thereby increasing the heat rquirements of the process. On the other hand, the cost of separating hydrogen mixtures from the product gas increases with the concentration of hydrogen in the separated mixture. Accordingly, the optimum composition of the hydrogen-containing gas will be determined by balancing the cost of separating such gas from the product gas against the cost of supplying addiitonal heat. Usually the optimum gas mixture will contain at least about 85 per cent by volume of hydrogen and less than about 15 per cent by volume of an inert gas selected from the class consisting of nitrogen, carbon monoxide and mixtures of nitrogen and carbon monoxide. Preferably, but not necessarily, the hydrogen-containing gas is preheated to substantially the same temperature as the preheated reactant gas prior to its introduction into the reaction zone in the manner herein specified. The heating means employed may be the same as those provided for preheating the reactant gas, or they may be independent.

As previously stated, introduction of the hydrogen-containing gas into the reaction zone in the particular manner herein described permits a very substantial reduction in the amount of hydrogen required to secure the advantages inherent in the general hydrogen-addition process. Heretofore, the hydrogen-containing gas was employed in an amount sufficient to provide at least 0.5 mole, and preferably more than 1.5 moles, of hydrogen per mole of hydrocarbon in the reactant gas. By introducing the hydrogen-containing gas into the reaction zone along the walls thereof in the manner of the invention, however, only from about 0.1 to about 1, usually from about 0.3 to about 0.6, moles of hydrogen need be provided per mole of hydrocarbon. This amounts to a reduction of about 80 per cent in the amount of hydrogen required, and since the proportion of hydrogen in the product gas is not substantially reduced, recovery of the required amount of hydrogen is greatly simplified. In some instances it may permit dispensing entirely with the hydrogen recovery and recycle operations, which has heretofore been economically unfeasible.

It is essential to the successful operation of the process of the invention that the reactant gas be preheated and introduced into the reaction zone in a plurality of relatively small streams, i. e., a number of streams each of which has a cross-sectional area representing only a small fraction of the cross-sectional area of the reaction zone. This requirement appears to be identified with the aforementioned probability that the portion of the reactant gas which is located near the center of the reaction zone and farthest from the peripheral film comprising hydrogen may undergo a type of reaction which is more critically dependent upon the preheat temperature than the reaction which occurs in the presence of hydrogen. The number of streams into which the reactant is divided during the preheating will depend primarily upon the capacity of the reactor and the heat transfer characteristics of the preheating zone thereof, but is usually at least four and may be as many as fifty or more.

The temperature to which the reactant gas is preheated prior to its introduction into the reaction zone is such that the temperature attained in the reaction which is induced by introduction of the hydrogen into the reaction zone is between about 1100° C. and about 1500° C., preferably between about 1275° C. and about 1375° C. It is a unique characteristic of the hydrogen addition process that the reactant gas can be preheated to relatively high temperatures, e. g. 600–1150° C., in the absence of hydrogen without reaction occurring to any substantial extent, but upon the introduction of hydrogen into the preheated reactant gas an exothermic acetylene-producing reaction takes place spontaneously and without the addition of any further substantial quantity of heat. As a result of such exothermic reaction taking place, the temperature of the reacting gas increases very rapidly to much high values. Maximum yields of acetylene are attained when such temperature is between about 1100° C. and about 1500° C. The temperature to which the reactant gas must be preheated in order to secure a reaction temperature within this range depends upon a number of factors, including the composition of the reactant gas, and the residence time within the preheating zone. These factors are variables which contribute to the possibility of reaction occurring between the reactant gas components during the preheating in the absence of the added hydrogen. Inasmuch as it is desirable to avoid such reaction, these variables should be so controlled that the preheat temperature is sufficient to attain the desired subsequent reaction temperature but is not so high that reaction between the components of the reactant gas takes place to any substantial extent during the preheating. With reactant gas mixtures of the composition previously given it is usually desirable to preheat as rapidly as possible, e. g., in from about 0.005 to about 0.5 second. Thus, it is usually desirable to combine the components of the reactant gas prior to preheating the same, and to pass the mixture through the preheating zone at a relatively high velocity. Under ordinary conditions of operation the preheat temperature will be between about 600° C. and about 1150° C. and the preheat time will be between about 0.1 and about 0.005 second. Under any given set of conditions, the optimum preheat temperature for the present process will be somewhat higher than that for the hydrogen-addition process as previously practised.

The reaction time, i. e., the time interval between introduction of the preheated reactant gas into the reaction zone and the cooling of the product gas to a temperature at which substantially no further reactions occur, varies inversely with the reaction temperature. Shorter reaction times are employed at the higher reaction temperatures within the given range, and vice versa. Such time is between about 0.001 and about 0.05 second, preferably between about 0.002 and about 0.02 second, and is readily controlled by varying the rate at which the gases are introduced into and are withdrawn from the reaction zone. The temperature to which the product gas is cooled within such period of time after introduction of the preheated reactant gas into the reaction zone is usually below about 600° C.

Figure 3:
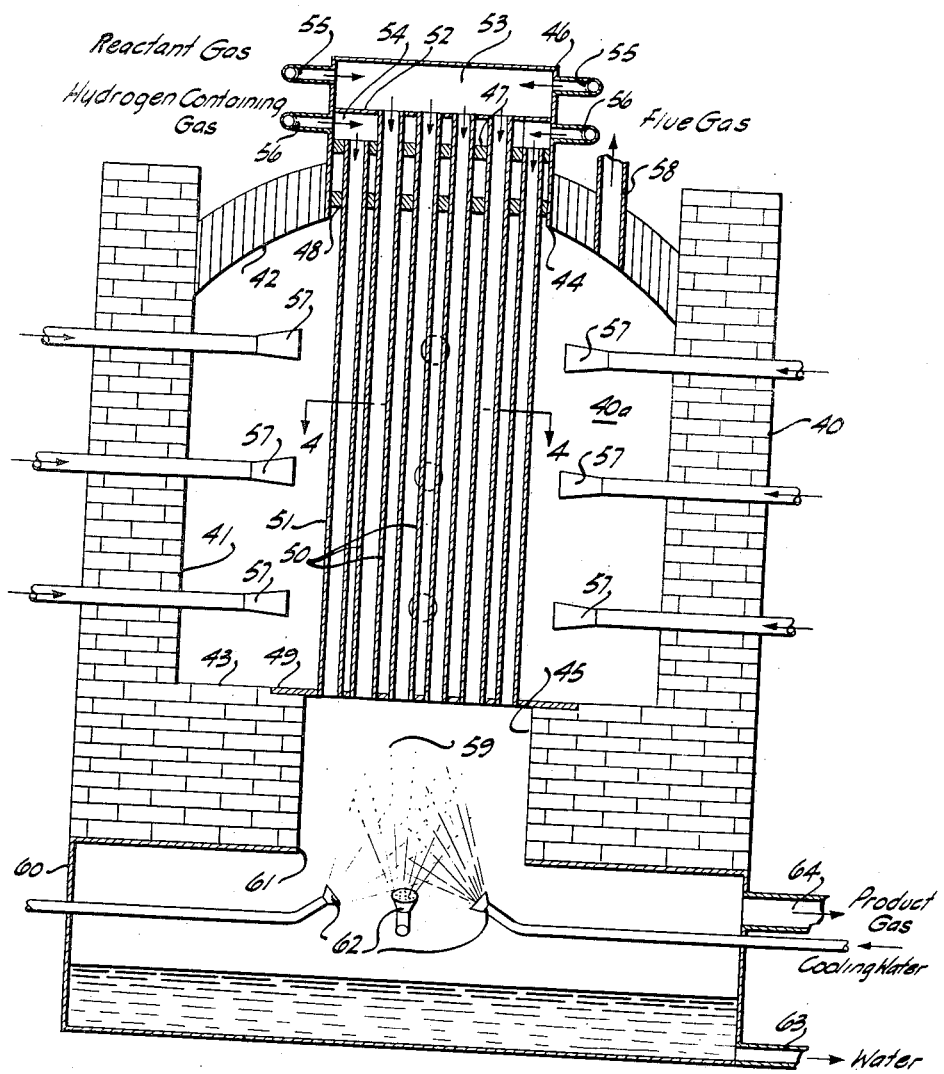
Figure 3 represents a longitudinal cross-sectional view of a somewhat different reactor suitable for use in practicing the invention on a somewhat larger scale.
Figure 4:
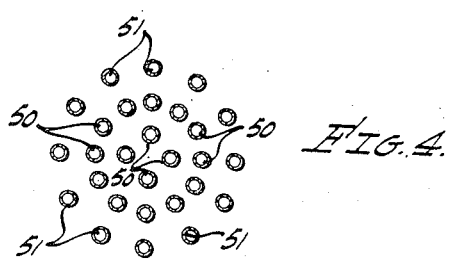
Figure 4 represents a transverse cross-sectional view of this reactor taken along line 4—4 of Figure 3.

As will be seen from the foregoing, the principle of the invention resides in introducing a plurality of streams of a preheated reactant gas comprising a hydrocarbon and oxygen into a reaction zone and concurrently, in time as well as direction, therewith introducing a hydrogen-containing gas adjacent the peripheral boundaries of said zone so that a gaseous film comprising hydrogen is interposed between the body of reactant gas and said boundaries of the zone, while observing the operating conditions herein specified. Various ways of applying this principle will be apparent to those skilled in the art. Figures 3 and 4 diagrammatically illustrate a type of reactor suitable for commercial application.

Referring now to Figures 3 and 4, in which like numerals designate like parts, the reactor shown consists of a circular furnace 40, constructed of firebrick or other refractory material, having a firebox 40a defined by wall portions 41, a roof portion 42, and floor portion 43. A relatively large circular opening 44 extends through roof portion 42, coaxial with the vertical axis of the furnace, and directly below opening 44 an opening 45 of equal size extends through floor portion 43. Opening 44 is closed by a header 46 internally provided with upper supporting members 47 and 48. A lower supporting member 49 closes opening 45 at the level of furnace floor 43. Supporting members 47 and 48 and 49 are perforated to receive and support reactant gas preheating tubes 50 and hydrogen-containing gas preheating tubes 51 parallel to each other vertically within firebox 40a. Preheating tubes 50 and 51 are arranged in a concentric circular pattern, with the hydrogen-containing gas preheating tubes 51 occupying the peripheral circle of the pattern. Header 46 is provided with a transverse partition 52 which defines a reactant gas introduction zone 53 communicating with reactant gas preheating tubes 50, and a hydrogen-containing gas introduction zone 54 communicating with hydrogen-containing gas preheating tubes 51. Reactant gas inlet manifold 55 communicates with reactant gas introduction zone 53 and a source of reactant gas, not shown. Hydrogen-containing gas inlet manifold 56 communicates with hydrogen-containing gas introduction zone 54 and a source of hydrogen-containing gas, not shown. Burners 57 communicating with a suitable fuel supply, not shown, are positioned within firebox 40a so as to supply heat to preheating tubes 50 and 51, and a flue 58 extends through furnace roof 42 to provide an exit for the flue gas produced by burners 57. Floor portion 43 of furnace 40 is of considerable thickness so that opening 45 which extends therethrough forms an elongated passageway constituting a reaction zone 59 into which the preheated gases are introduced from preheating tubes 50 and 51. Since hydrogen-containing gas preheating tubes 51 are arranged around the periphery of the circular pattern of tubes, the hydrogen-containing gas is necessarily introduced into reaction zone 59 immediately adjacent to the walls thereof and forms a gaseous layer or film between said walls and the streams of preheated reactant gas introduced into the reaction zone through tubes 50.

Quenching box 60, which may be constructed of sheet metal, is positioned directly below furnace 40, and has an upper opening 61 coinciding with opening 45 in furnace floor 43. Spray nozzles 62 are positioned within quenching box 60 so as to direct a liquid cooling medium, e. g. water, into the hot product gas issuing from reaction zone 59. A duct 63 is provided for draining the cooling medium from the quench box, and product gas outlet 64 is provided for withdrawing the cooled product gas and passing it to storage means, not shown.

Operation of this reactor is substantially the same as that outlined above in connection with the reactor of Figures 1 and 2. The reactant gas passes from manifold 55 via introduction zone 53 through preheating tubes 50 and into reaction zone 59. Concurrently, the hydrogen-containing gas is introduced into manifold 56 and passes via introduction zone 54 through preheating tubes 51 and into reaction zone 59. During passage through their respective preheating tubes the reactant and hydrogen-containing gases are heated to the requisite preheat temperature by means of burners 57 which are supplied with a suitable fuel, e. g., fuel oil or natural gas, and air. Within reaction zone 59, the hydrogen-containing gas is for the most part interposed as a gaseous film between the walls thereof and most of the reactant gas, and reaction occurs accompanied by an increase in temperature as previously described. The velocity of the gases through the reactor is so controlled that the hot product gas is cooled to a relatively low temperature by the cooling medium introduced through nozzles 62 within the short period of time herein specified. The cooled product gas is withdrawn through outlet 64 and passed to suitable storage or separating means.

The following example will illustrate practice of the process of the invention, but is not to be construed as limiting the same.

*Example*

The apparatus employed is similar to that shown in Figure 1 except that the tubes through which the hydrogen-containing gas is introduced into the reaction zone extend through the preheating zone in the manner illustrated in Figure 3. The hydrogen-containing gas is thus preheated prior to its introduction into the reaction zone. Heat is supplied to the preheating zone by means of "Glo-Bar" resistance elements mounted parallel to the preheating tubes. Operating conditions are as follows:

Reactant gas:
   Methane _____ 24.6% by vol.
   Air _____ 73.4% by vol.
Hydrogen-containing gas:
   Hydrogen _____ 95% by vol.
   Nitrogen _____ 5% by vol.
Rate of feed, reactant gas_____ 62.6 s. c. f./hr.
Rate of feed, hydrogen-containing gas_____ 10.5 s. c. f./hr.
Residence time in preheat zone 0.005 sec.
Residence time in reaction zone 0.004 sec.
Mole ratio, hydrogen/methane_ 0.3/1

The yield of acetylene, based on methane consumed, is about 48 per cent. Approximately one volume of acetylene is formed per volume of hydrogen introduced into the reaction zone.

As will be apparent to those skilled in the art, many variations with respect to different operating variables, reactor design, etc. are possible within the herein defined scope of the invention, and various engineering techniques may be applied to the practice of the invention on a commercial scale. Thus for example, part of the preheating of the reactant gas and/or hydrogen-containing gas may be effected by indirect heat exchange against the product gas which, even though it has been quenched within the reactor, is usually withdrawn therefrom at a moderately elevated temperature, e. g., 300°–600° C. Various forms of heaters and different types of fuel may be employed for pre-heating, and the reactor may take various forms adapted to conserve heat as much as possible. Various refractory materials and heat-resistant metal alloys may be employed in its construction. Likewise, the product gas may be treated in various known ways to separate the different constituents thereof. The acetylene product may be separated by adsorption on a solid adsorbent, by selective solvent extraction, or by a selective chemical reaction as by absorption in aqueous solutions of certain metal salts. The unreacted hydrocarbon may be recovered for reuse in the process by selective adsorption on activated charcoal, and the same type of operation may be employed to recover a hydrogen-containing gas suitable for re-use in the process. Various hydrocarbon reactants may be employed, although best results are attained with methane or natural gas.

Other modes of applying the principle of my invention may be employed instead of those explained, change being made as regards the materials and apparatus employed, provided the steps stated by any of the following claims, or the equivalent of such stated steps, be employed.

I, therefore, particularly point out and distinctly claim as my invention:

1. In a process wherein (1) a reactant gas mixture essentially comprising a non-aromatic hydrocarbon having a normal boiling point below about 400° F. and oxygen is preheated to a temperature below that at which reaction spontaneously occurs between said hydrocarbon and oxygen but such that upon subsequent admixture of the preheated reactant gas with a hydrogen-containing gas comprising from about 30 to 100 per cent by volume of molecular hydrogen and from about 70 to zero per cent by volume of an inert gas there occurs an acetylene-producing reaction in which a temperature between about 1100° C. and about 1500° C. is attained, (2) the preheated reactant gas and a hydrogen-containing gas of the aforesaid composition are separately but simultaneously introduced into a reaction zone, and (3) a product gas is withdrawn from said reaction zone and is cooled to a temperature at which substantially no further reaction occurs, said cooling being effected within from about 0.001 to about 0.05 second after the introduction of the preheated reactant gas into said reaction zone; the improvement which consists in introducing the preheated reactant gas into said reaction zone in a plurality of separate streams, and introducing said hydrogen-containing gas into said reaction zone adjacent the boundaries thereof so as to provide a gaseous film comprising the added hydrogen interposed between said boundaries and said streams of preheated reactant gas.

2. A process according to claim 1 wherein the reactant gas comprises oxygen and a normally gaseous saturated aliphatic hydrocarbon, the mole ratio of hydrocarbon to oxygen being between about 1.33/1 and about 3.0/1.

3. A process according to claim 1 wherein the reactant gas comprises from about 17 to about 30 per cent by volume of a hydrocarbon selected from the class consisting of methane and natural gas and from about 83 to about 70 per cent by volume of air.

4. A process according to claim 1 wherein the reactant gas is preheated to a temperature between about 600° C. and about 1150° C. prior to its introduction into the reaction zone.

5. A process according to claim 1 wherein the hydrogen-containing gas is preheated to substantially the same temperature as the reactant gas prior to its introduction into the reaction zone.

6. A process according to claim 1 wherein the hydrogen-containing gas comprises at least about 85 per cent by volume of free hydrogen and less than about 15 per cent by volume of a gas selected from the class consisting of nitrogen, carbon monoxide, and mixtures of nitrogen and carbon monoxide.

7. In a process wherein (1) a reactant gas mixture essentially comprising a normally gaseous saturated aliphatic hydrocarbon and oxygen in a molar ratio of between about 1.33 and about 3.0 moles of hydrocarbon per mole of oxygen is passed through a preheating zone wherein said reactant gas is preheated to a temperature which is between about 600° C. and about 1150° C. but which is below that at which reaction spontaneously occurs between said hydrocarbon and oxygen, (2) the preheated reactant gas is introduced into an elongated reaction zone, (3) an acetylene-producing reaction in which a temperature between about 1100° C. and about 1500° C. is attained is initiated within said reaction zone by simultaneously introducing thereinto a hydrogen-containing gas comprising from about 30 to 100 per cent by volume of molecular hydrogen and from about 70 to zero per cent by volume of an inert gas, and (4) an acetylene- and hydrogen-containing product gas is withdrawn from said reaction zone and cooled to a temperature at which substantially no further reaction occurs, said cooling being effected within from about 0.001 to about 0.05 second after the introduction of the preheated reactant gas into said reaction zone; the improvement which consists in introducing the preheated reactant gas into the axial portion of said reaction zone in a plurality of substantially parallel concurrent separate streams, and introducing said hydrogen-containing gas into said reaction zone adjacent the peripheral boundaries thereof and concurrent with said streams of preheated reactant gas so as to provide a gaseous film comprising the added hydrogen interposed between said boundaries and said streams of preheated reactant gas.

8. A process according to claim 7 wherein sufficient of the hydrogen-containing gas is introduced into the reaction zone to provide between about 0.1 and about 1 mole of hydrogen per mole of hydrocarbon in the reactant gas.

9. A process according to claim 7 wherein the reactant gas comprises from about 17 to about 30 per cent by volume of a hydrocarbon selected from the class consisting of methane and natural gas and from about 83 to about 70 per cent by volume of air.

10. A process according to claim 7 wherein the hydrogen-containing gas is preheated to substantially the same temperature as the preheated reactant gas prior to its introduction into the reaction zone.

11. A process according to claim 7 wherein a temperature between about 1275° C. and about 1375° C. is permitted to be attained in the acetylene-producing reaction which occurs within the reaction zone.

12. A process according to claim 7 wherein the product gas is withdrawn from the reaction zone and cooled to a temperature below about 600° C. within from about 0.002 to about 0.02 second after introduction of the preheated reactant gas into the reaction zone.

13. A process according to claim 7 wherein the hydrogen-containing gas comprises at least about 85 per cent by volume of free hydrogen and less than about 15 per cent by volume of a gas selected from the class consisting of nitrogen, carbon monoxide, and mixtures of nitrogen and carbon monoxide.

14. In a process wherein (1) a reactant gas mixture essentially comprising from about 17 to about 30 per cent by volume of a hydrocarbon selected from the class consisting of methane and natural gas and from about 83 to about 70 per cent by volume of air is passed through a preheating zone wherein said reactant gas is preheated to a temperature which is between about 600° C. and about 1150° C. but which is below that at which reaction spontaneously occurs between said hydrocarbon and air, (2) the preheated reactant gas is introduced into an elongated reaction zone, (3) a hydrogen-containing gas comprising at least about 85 per cent by volume of free molecular hydrogen and less than about 15 per cent by volume of an inert gas selected from the class consisting of nitrogen, carbon monoxide and mixtures of nitrogen and carbon monoxide is passed through a second preheating zone wherein said hydrogen-containing gas is preheated to substantially the same temperature as the preheated reactant gas, (4) an acetylene-producing reaction in which a temperature between about 1100° C. and about 1500° C. is attained is initiated within said reaction zone by introducing thereinto the preheated hydrogen-containing gas, and (5) an acetylene- and hydrogen-containing product gas is withdrawn from said reaction zone and cooled to a temperature below about 600° C., said cooling being effected within from about 0.002 and about 0.02 second after the introduction of the preheated reactant gas into said reaction zone; the improvement which consists in introducing the preheated reactant gas into the axial portion of said reaction zone in at least four substantially parallel concurrent separate streams, and introducing said preheated hydrogen-containing gas into said reaction zone adjacent the peripheral boundaries thereof and concurrent with said streams of preheated reactant gas so as to provide a gaseous film comprising the added hydrogen interposed between said boundaries and said stream of preheated reactant gas.

References Cited in the file of this patent

UNITED STATES PATENTS

| Number | Name | Date |
| --- | --- | --- |
| 1,965,770 | Burgin | July 10, 1934 |
| 1,965,771 | Groll et al. | July 10, 1934 |
| 2,160,170 | Martin et al. | May 30, 1939 |
| 2,167,471 | Auerbach | July 25, 1939 |
| 2,195,227 | Sachsse | Mar. 26, 1940 |
| 2,337,245 | Krejci | May 29, 1945 |

FOREIGN PATENTS

| Number | Country | Date |
| --- | --- | --- |
| 470,360 | Great Britain | Aug. 13, 1937 |